United States Patent [19]

Mathews et al.

[11] 4,019,612
[45] Apr. 26, 1977

[54] AUTOMATIC SLACK ADJUSTER WITH INTERNAL REFERENCE POINT

[75] Inventors: George P. Mathews, Birmingham; Thaddeus Lech, Jr., Roseville, both of Mich.

[73] Assignee: Borg-Warner Corporation, Chicago, Ill.

[22] Filed: July 14, 1976

[21] Appl. No.: 705,378

[52] U.S. Cl. .................... 188/196 BA; 188/79.5 K
[51] Int. Cl.² ........................................ F16D 65/56
[58] Field of Search ............... 188/79.5 K, 196 BA

[56] References Cited

UNITED STATES PATENTS

| 2,554,065 | 5/1951 | Shields | 188/79.5 K |
|---|---|---|---|
| 2,752,009 | 6/1956 | MacDougall | 188/196 BA |
| 2,920,724 | 1/1960 | Margetic et al. | 188/196 BA |
| 3,351,164 | 11/1967 | Svensson | 188/196 BA |
| 3,392,810 | 7/1968 | Svensson | 188/196 BA |
| 3,482,663 | 12/1969 | McGregor et al. | 188/196 BA |
| 3,507,369 | 4/1970 | Oliver | 188/196 BA |
| 3,692,152 | 9/1972 | Larsson | 188/79.5 K |
| 3,901,357 | 8/1975 | Reitz et al. | 188/79.5 K |
| R26,965 | 10/1970 | Sander et al. | 188/196 BA |

*Primary Examiner*—Duane A. Reger
*Attorney, Agent, or Firm*—James A. Geppert

[57] ABSTRACT

A slack adjuster for vehicle brakes that utilizes an adjustment means actuated by the brake piston rod comprising a load biased rotatable worm shaft and clutch actuated by a reciprocable rack. The piston rod operated by the vehicle brake pedal is operatively connected to the slack adjuster lever and housing through a clevis pivotally mounted intermediate its ends to the lever and connected through a second pivotal connection on the free end of the clevis with an actuating rod that is connected to the reciprocable rack through a lost motion connection.

39 Claims, 12 Drawing Figures

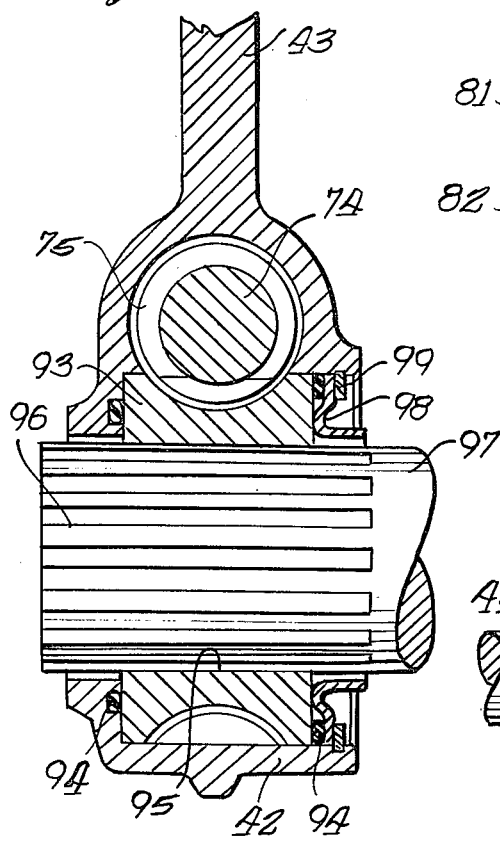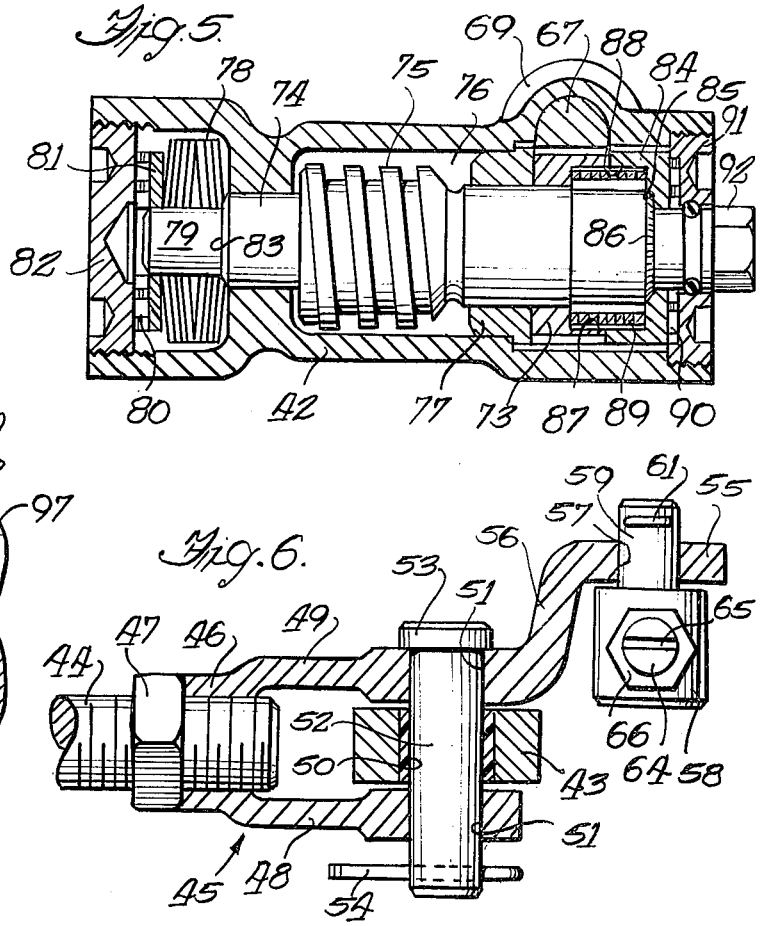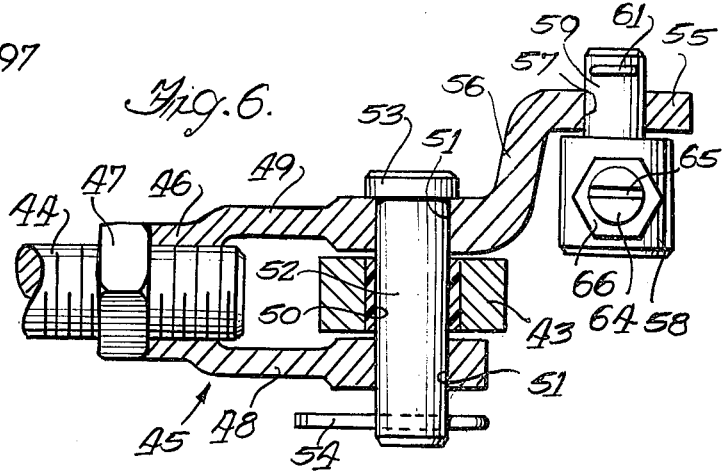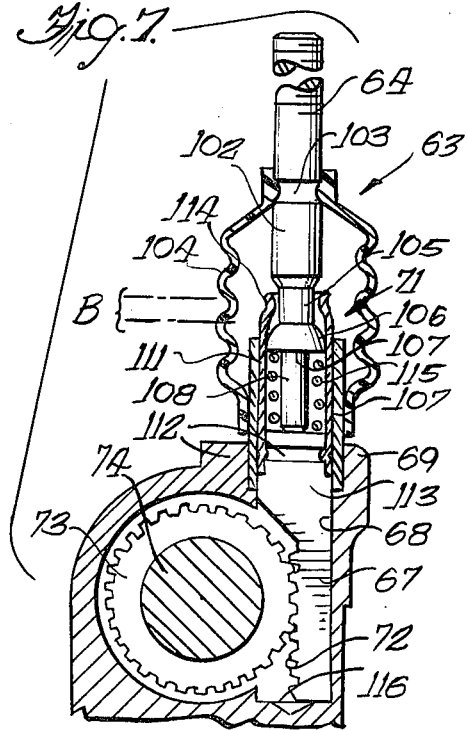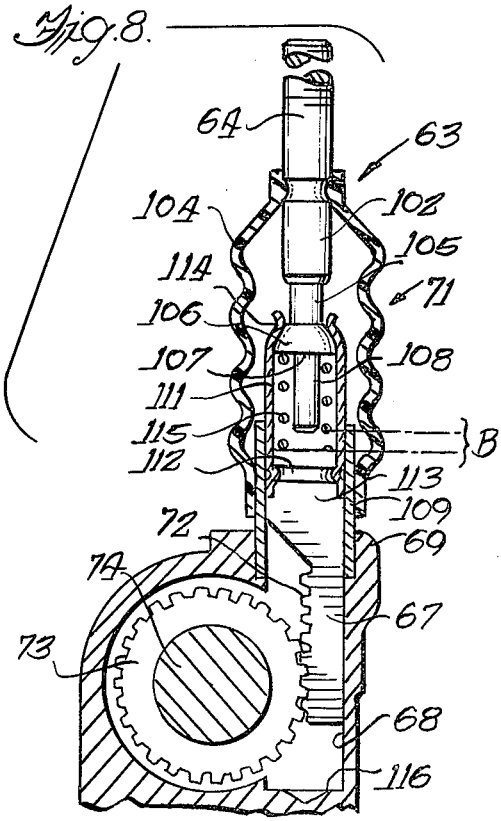

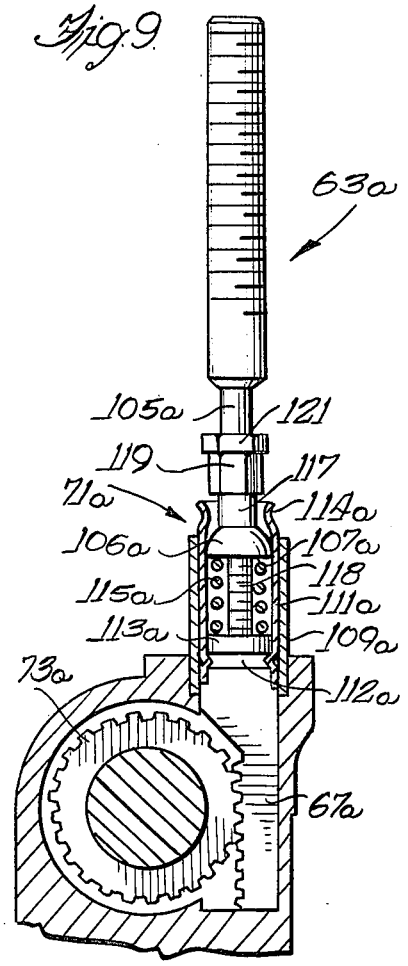
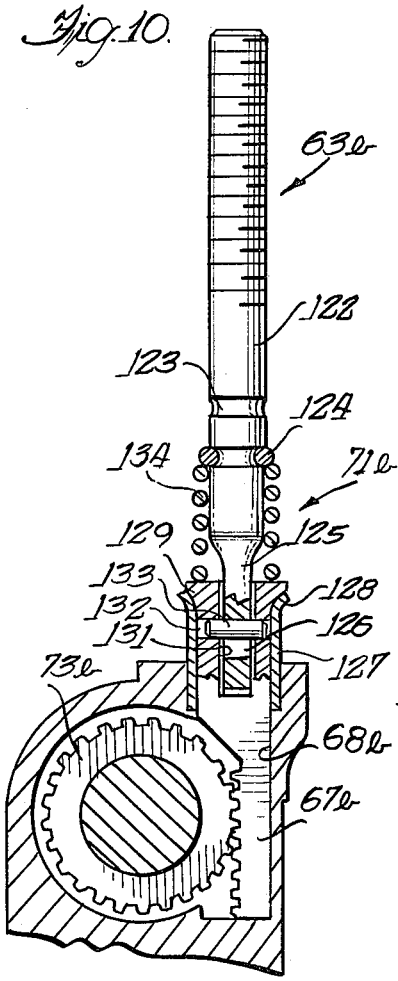
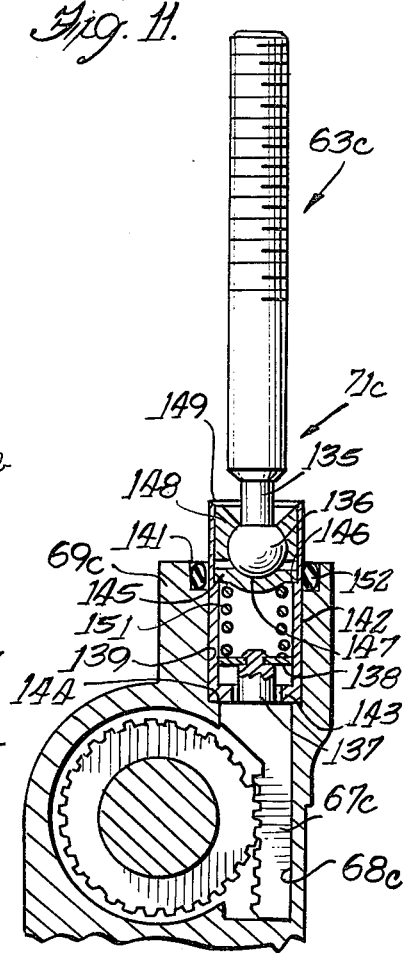
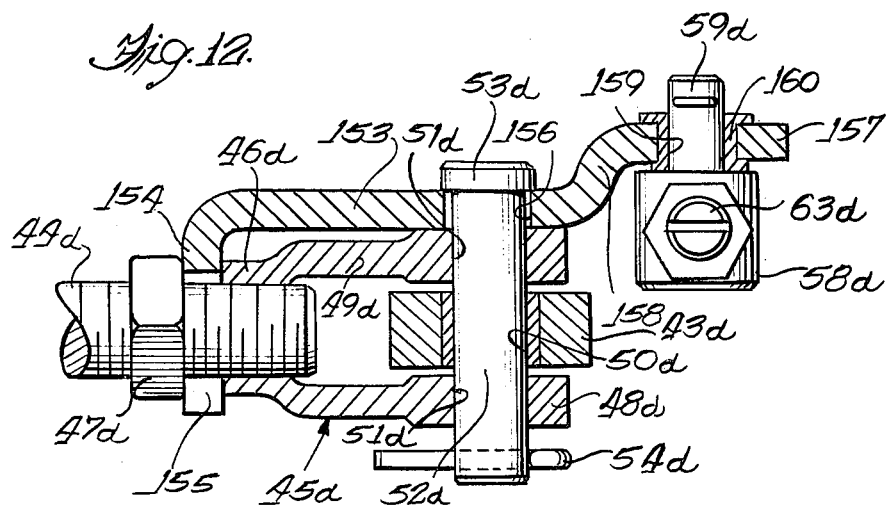

AUTOMATIC SLACK ADJUSTER WITH INTERNAL REFERENCE POINT

BACKGROUND OF THE INVENTION

Vehicle brake slack adjusters for heavy duty vehicles requiring high braking power have either a manual adjustment of the device to compensate for brake lining wear or an automatic adjustment. Brake lining wear causes a gradual increase in the brake cylinder piston stroke with a resulting decrease in braking efficiency between manual adjustments. In view of the problems attendent with manual adjustment, automatic slack adjusters have been developed to provide substantially automatic and continuous compensation for the wear of the brake linings.

Automatically adjusting brake levers employing brake chamber piston rod linkages utilize the relative motion between the lever and the piston rod to actuate the adjusting mechanism on each piston stroke. Many of the presently known automatic slack adjusters, as exemplified by U.S. Pat. Nos. 3,351,164 and 3,392,810 provide a ground or stationary reference point on the vehicle which cooperates with a driving member in the rotatable braking lever to provide movement of the driving member upon excessive rotation of the braking lever beyond a predetermined position; the movement of the driving member acting to cause rotation of a worm on a load biased rotatable wormshaft and clutch. The worm meshes with a worm gear on the braking cam shaft to adjust the amount of slack in the system.

The ground or stationary reference point is often achieved by a control arm on the braking lever which must be secured to the vehicle axle or brake plate by means of an anchor bracket. It is difficult at times to devise a simple bracket to do the job since the environment for each pair of slack adjusters for a tractor-trailer combination may be different for each axle and right-hand and left-hand units are needed. This results in tooling up and stocking a multiplicity of brackets adding considerably to the cost and complicating field servicing.

SUMMARY OF THE INVENTION

The present invention relates to an automatic slack adjuster and more particularly to an automatic slack adjuster with an internal reference point to provide a controlled amount of brake shoe-drum clearance on a substantially continuous basis.

The present invention comprehends the provision of an automatic slack adjuster with a load-biased, rotatable wormshaft and coupling engageable upon imminent shoe-drum disengagement and a piston rod-actuated linkage associating an internal reference point in the adjuster with a variably located pivot point on the piston rod through a lost motion connection. The internal reference point eliminates the need for an anchor bracket by which a control arm is grounded to the vehicle axle or brake plate and the control arm normally journalled in the braking lever along with the attendant ring member, seals and springs previously required in a slack adjuster such as shown in U.S. Pat. Nos. 3,351,164 and 3,392,810.

The present invention has the purpose of employing the piston rod connected to the braking lever by a clevis as the actuation means for the automatic slack adjustment through a linkage between a reciprocable rack and the clevis. The rack reciprocates to rotate a gear journalled on the wormshaft in the braking lever housing and the worm gear is rotated by rotation of the gear in one direction through a one-way clutch. This arrangement provides excellent operating performance and, due to the elimination of the control arm, ring, seals and springs simplifies the structural arrangement and the machining of the housing. Also, the rack utilized for this arrangement is simpler and less costly.

The present invention also comprehends the provision of a lost-motion connection in the linkage between the clevis and the reciprocable rack. The lost-motion connection operatively connects the free end of the clevis with the rack reciprocating to rotate the wormshaft and worm and adjust the running clearance between the brake shoes and brake drum. The lost-motion connection includes an actuating rod pivotally mounted on the clevis, a sleeve or extension on the upper end of the reciprocable rack and spring-biased means connecting the rod and extension and allowing a limited amount of relative movement therebetween.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

Fig. 4 is a vertical cross sectional view taken on the line 4—4 of FIG. 2.

FIG. 5 is a horizontal cross sectional view taken on the line 5—5 of FIG. 2.

FIG. 6 is a horizontal cross sectional view taken on the line 6—6 of FIG. 2.

FIG. 7 is a vertical cross sectional view, with certain parts shown in elevation, taken on the line 7—7 of FIG. 2 and showing the lost-motion connection in a brake release position.

FIG. 8 is a vertical cross sectional view similar to FIG. 7 but with the lost-motion connection in a brake apply position.

FIG. 9 is a vertical cross sectional view similar to FIG. 7 but showing a second embodiment of lost-motion connection in a brake release position.

FIG. 10 is a vertical cross sectional view similar to FIG. 7 but showing a third embodiment of lost-motion connection in a brake release position.

FIG. 11 is a vertical cross sectional view similar to FIG. 7, but showing a fourth embodiment of lost-motion connection in a brake release position.

FIG. 12 is a horizontal cross sectional view similar to FIG. 6 but showing an alternate mounting arrangement for the lost-motion connection.

DESCRIPTION OF THE PREFERRED EMBODIMENTS

Figure 1:
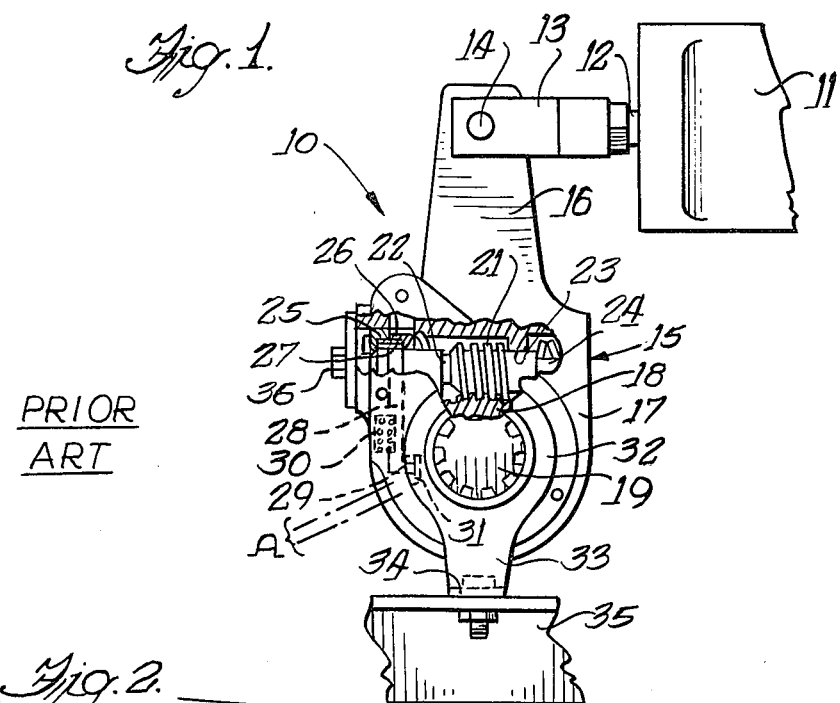
FIG. 1 is a side elevational view, partially broken away, of a presently known automatic slack adjuster having a fixed ground reference point.

Referring more particularly to the disclosure in the drawings wherein are shown illustrative embodiments of the present invention, FIG. 1 discloses a presently known slack adjuster assembly 10, as disclosed in U.S. Pat. No. 3,392,810, wherein an air cylinder 11 reciprocates a piston rod 12 secured to a clevis 13 which, in turn, is pivotally connected through a pivot pin 14 to the upwardly extending lever 16 of a slack adjuster 15. A housing 17 integral with the lever 16 has a cavity containing a worm gear 18 internally splined for a non-rotatable connection with a cam shaft 19 having on its opposite end a brake-actuating cam (not shown).

A secondary recess in the housing 17 accommodates a worm 21 meshing with the worm gear 18 and carried on a wormshaft 22 rotatably mounted in a passage 23. At one end 24, the shaft 22 is spring loaded to urge the shaft to the left and, at the opposite end, a coupling hub 25 is journalled on the shaft and engages a clutching surface on the shaft. A gear wheel 26 adjacent the coupling hub 25 is also journalled on the shaft, and a one-way spring clutch 27 operatively connects the coupling hub 25 and the gear wheel 26 to cause rotation of the shaft upon rotation of the gear wheel in one direction. A slide member 28 is reciprocable in a groove in the housing 17 and has a toothed rack at one end engaging the gear wheel 26 and a lateral projection 29 at the opposite end received in a peripheral arcuate recess 31 formed in a ring 32 journalled in the housing. One or more return springs 30 are positioned in the housing with one end abutting a housing shoulder and the opposite end engaging a surface on the lower end of the slide member 28 to yieldably bias the member 28 downwardly. The ring 32 is provided with a laterally extending arm 33 projecting beyond the housing to be rigidly mounted at its free end 34 onto a stationary portion 35 of the vehicle chassis.

The distance A corresponds to the desired or normal running clearance between the brake linings and brake drum; such distance also equalling the extent of lost-motion permitted by the projection 29 in the arcuate recess 31 of the ring 32. The braking operation can be divided into three parts: (1) the clearance part (normal running clearance); (2) the excess part (excess clearance due to lining wear); and (3) the elasticity part (elasticity of the drums, shoes, etc.). During normal operation with new brake linings, depressing the brake pedal by the vehicle operator causes the cylinder 11 to project the piston rod 12 and cause rotation of the lever 16 and housing 17 relative to the ring 32 which is stationary. Rotation of the housing results in rotation of the worm gear 18 and cam shaft 19 to urge the brake linings into engagement with the brake drum for the vehicle.

Further movement of the piston and housing brings the brake shoes into contact with the drum and at the same time brings the projection 29 into contact with the lower surface of the recess 31. Continuing movement raises the slide member 28 off of its seat in the housing against the resistance of return springs 30 to rotate the gear wheel counterclockwise, as viewed from the left side of FIG. 1, but the wormshaft is not rotated since the one-way clutch 27 overruns. Once the shoes firmly engage the drum, any additional rotation of the housing due to elasticity results in the development of brake apply forces causing the wormshaft to shift against the bias of the spring assembly at the shaft end 24 causing disengagement of the coupling members. Meanwhile, movement of the slide member 28 rotates the gear wheel 26, clutch 27 and coupling hub 25, but not the wormshaft.

Upon initiation of brake release movement and reverse rotation of the housing 17, the return springs 30 keep the projection 29 in contact with the lower surface of recess 31 causing clockwise rotation of the gear wheel, clutch (now driving) and coupling which is still disengaged from the wormshaft. Upon further release, the load on the wormshaft is reduced the coupling surfaces re-engage, the shoes are about ready to break contact with the drum and the slide member has bottomed in the housing. Final release finds the slide member and housing moving as one with projection 29 traversing the distance A from contact at the bottom surface to the upper surface of the recess 31, during which movement the shoe-to-drum clearance becomes normal as determined by the distance A.

Once wear begins to occur in the brake linings, the running clearance will exceed the distance A so that rotation of the housing 17 to engage the brake linings with the brake drum will be greater than with new linings. Projection 29 will engage the lower surface of the recess 31 in the stationary ring 32 when normal clearance has been covered, but additional rotation of the housing due to wear will cause more upward movement of the slide member 28 in the housing and rotation of the gear wheel 26 with the one-way clutch disengaged from the coupling hub 25 in this direction of rotation. Once the brake linings engage the brake drum, any additional movement of the lever 16 due to elasticity or deformation of the brake drum, brake shoes, etc. results in a force increase sufficient to cause the worm and wormshaft to be displaced axially against the force of the spring assembly at the shaft end 24 so that the coupling surfaces between the coupling hub 25 and the wormshaft 22 are disengaged. Meanwhile, movement of the slide member 28 rotates the gear wheel 26, clutch 27 and coupling hub 25, but not the wormshaft.

When the brake pedal is released and the air cylinder 11 acts to retract the piston rod 12, the first increment of movement of the lever 16 covers the movement resulting from elasticity or deformation and the slide member having been kept in contact with the lower surface of the recess 31 by the return springs 30 turns the gear wheel, clutch (now engaged) and coupling hub clockwise, (viewed from the left side of FIG. 1). Further movement reduces the force on the wormshaft, allowing the wormshaft to shift and the coupling surfaces to re-engage at about the time the shoes are close to leaving the drum and starting to develop running clearance. The travel of the slide member now stops because the slide return springs 30 cannot overcome the force of the brake shoe return spring and friction locking the worm and worm gear together. Release continues with the housing and slide member moving together so that the projection 29 traverses the distance A in the recess 31 to contact the upper surface of the recess. This causes the slide member to be pulled downward toward its stop rotating the gear wheel, clutch, coupling hub and worm in a clearance adjusting direction.

In installing this type of slack adjuster on a vehicle, a control arm anchor bracket (not shown) is positioned on a stationary vehicle member, such as a stationary portion of the axle, and the slack adjuster 15 is mounted on the brake cam shaft 19 to rotate therewith. The opening in the lever 16 is aligned with the openings in the clevis 13 and the pivot pin 14 installed, and the control arm 33 is manually rotated to contact the top surface of projection 29 to force slide member 28 to bottom in housing 17; then the bracket is shifted so that the free end 34 of the arm 33 is aligned with a mounting portion on the bracket, and the bracket is tightened in that position and secured to the end 34. If adjustment is required before use, an exposed hexagonal end 36 of the wormshaft 22 is engaged by a wrench or other suitable tool and the shaft rotated to adjust the initial running clearance for the adjuster.

Considering the present invention as shown in FIGS. 2 through 8, the stationary ground point 35 has been eliminated and replaced by an internal reference point 116. The slack adjuster 41 includes a housing 42 and an upwardly extending lever 43 adapted to be actuated by a piston rod 44 through a clevis 45. The piston rod 44 is threaded on its outer end to threadingly engage the base 46 of the clevis and a lock nut 47 on the piston acts to lock the piston and clevis in an adjusted position. The clevis terminates in a pair of arms 48, 49 with openings 51 to receive a pivot pin 52; the arms receiving the lever 43 therebetween and the pin 52 extending through an opening 50 therein. An enlarged head 53 on one end and a cotter pin 54 extending through an opening in the free end of the pin retains the clevis and lever together.

The arm 49 of the clevis has an extended end 55 beyond the arm 48 and offset therefrom by an intermediate offset portion 56. The end 55 has an opening 57 receiving the reduced end 59 of a swivel pin 58; the pin being retained in the end 55 by a cotter pin 61. The swivel pin is provided with an internally threaded opening 62 therethrough to receive therein the upper threaded end 64 of an actuating rod 63; the upper end of the rod being provided with a slot 65, and a jam nut 66 threaded onto the end 64 engages the swivel pin 58 to retain the rod in its adjusted position relative to the swivel pin.

The ring 32 of the previously described adjuster has been eliminated and the slide member 28 has been replaced by a rack 67 reciprocably mounted in a blind hole 68 in an offset boss 69 formed on the housing 42. The rack 67 is operatively connected to the rod 63 by a lost-motion device 71 to be later described, and has gear teeth 72 meshing with a gear wheel 73 journalled on a wormshaft 74. As more clearly seen in FIG. 5, the adjustment mechanism is substantially identical to that shown in FIG. 1 and includes a worm 75 mounted on the wormshaft 74 rotatable in a stepped passage 76 extending through the housing 42 and journalled in a bearing sleeve 77 mounted therein. The spring-loading for the wormshaft comprises a plurality of Belleville springs 78 on a reduced end 79 of the shaft; with the springs abutting a reaction plate 81 backed by a thrust bearing 80 and plug 82 closing one end of the passage 76 and the opposite side of the spring stack engages a shoulder 83 on the wormshaft 74 defined by the reduced end 79.

Beyond and abutting the bearing sleeve 77 is the gear wheel 73 journalled on the wormshaft, and closely adjacent thereto is a coupling hub 84 also journalled on the wormshaft and having an interior serrated tapered or conical surface 85 adapted to be engaged by a serrated tapered or conical surface 86 formed on a reduced portion of the wormshaft. Both the gear wheel and the coupling clutch hub have internal cylindrical surfaces 87 and 88, respectively, cooperating with a one-way clutch 89 in the form of a helical spring. Coupling hub 84 is backed by a thrust bearing 90 and threaded plug 91 which closes the opposite end of the passage. A reduced portion of the worm shaft extends through the plug to terminate in a polygonal end 92 exposed at the exterior of the housing.

The worm 75 meshes with a worm gear 93 rotatably mounted in the housing and sealed therein by O-rings 94. The worm gear has internal splines 95 engaging the splined end 96 of a cam shaft 97 having a brake actuating cam (not shown) mounted on the opposite end. A closure plate 98 is retained by a lock ring 99 and retains the O-rings 94 and worm gear 93, as seen in FIG. 4.

The lost-motion connection 71 is clearly shown in FIGS. 7 and 8, wherein the actuating rod 63 has an unthreaded lower portion 102, with an annular groove 103 to receive the upper end bead of a flexible boot 104, a further reduced portion 105 with a spherical ball portion 106 having a flat undersurface 107, and terminating in a further reduced lower end 108. A guide tube 109 is press-fitted in a counterbore in the opening 68 and has the lower end bead of the flexible boot 104 mounted thereon. A rod tube 111 encompasses the spherical ball portion and lower end 108 and has its lower end crimped into an annular groove 112 formed in the enlarged upper end 113 of the rack 67; the upper end of the tube providing a spherical or conical closure 114 conformably receiving the reduced portion 105 and cooperating with the ball portion 106. A compression spring 115 is located within the tube 111 encompassing the lower end 108 with the opposite ends abutting the undersurface 107 and the upper end 113 of the rack.

Figure 2:
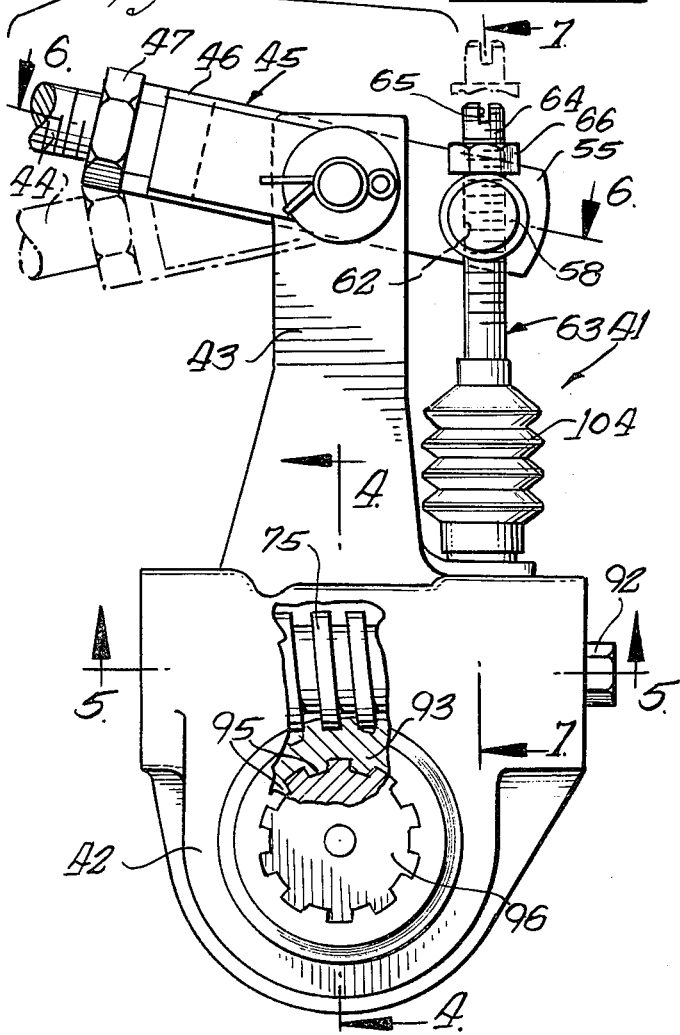
FIG. 2 is a side elevational view, partially broken away, of the automatic slack adjuster of the present invention.
Figure 3:
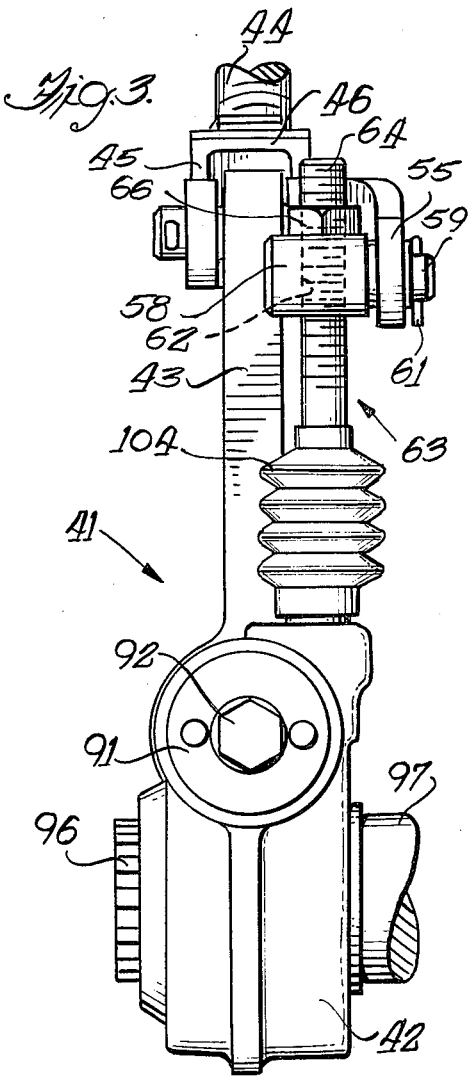
FIG. 3 is an end elevational view taken from the right-hand side of FIG. 2.

FIGS. 7 and 8 disclose the positioning of the rack and lost-mostion device in the brake release and brake applied positions, respectively. The spacing B shown in FIG. 8 corresponds to the desired running clearance between the brake linings and brake drum on a vehicle wheel. Thus, when the vehicle operator depresses the brake pedal, the air cylinder is actuated to project the piston rod 44 to the right as seen in FIG. 2 and rotate the lever 43 and housing 42 around the axis of the cam shaft 97 to cause rotation of the suitable S-shaped cam (not shown) and urge the brake shoes outwardly to engage the linings with the brake drum. As the lever 43 is rotated, the piston rod 44 and clevis 45 necessarily rotate about the axis of the pivot pin 52 from the solid line to the dotted line position.

Rotation of the clevis causes upward movement of the clevis arm 55 and swivel pin 58 to lift the actuating rod 63 upward relative to the housing. As the rod 63 is initially moved upward, the spherical ball portion 106 moves within the rod tube 111 away from the rack 67 allowing the spring 115 to expand while maintaining downward force on the rack. Relative motion of the rod with respect to the rod tube continues until the spherical ball portion 106 engages the spherical closure 114 on the rod tube and the distance B is traversed. Further movement of the piston to apply the brake linings and drum into the elastic portion of travel will lift the actuating rod 63 and the rack 67 through the now engaged spherical ball portion 106 and spherical closure 114 of the rod tube 111. Upward motion of the rack causes rotation of the gear wheel 73 relative to the wormshaft 74. This counterclockwise rotation, as seen in FIG. 8, of the gear wheel does not rotate the wormshaft and worm as the one-way clutch 89 contracts and does not engage the cylindrical surface 88 of the coupling hub 84.

Once the brake linings firmly engage the brake drum to cause braking of the vehicle wheel, any additional movement of the piston rod and lever due to elasticity in the system results in the development of brake apply forces imposed on the wormshaft through the worm gear teeth, causing the wormshaft to overcome the bias of the Belleville springs 78 and disengage the conical surface 86 from the conical surface 85 of the coupling hub 84. After shaft declutching has occurred, rotation of the gear wheel 73 now carries the coupling hub 84 and clutch spring along but no wormshaft rotation is possible. Upon release of the brake pedal and retraction of the piston rod 44, the initial rotation of the lever 43 and housing 42 acts to drive the actuating rod 63 and rack 67 downward as a unit causing clockwise rotation of the gear wheel 73, clutch spring 89 and coupling hub 84; rotation in this direction causing the one-way clutch spring 89 to expand against the cylindrical surfaces 87, 88 and lock the gear wheel and coupling hub together. However, the wormshaft remains disengaged from the coupling hub 84 and, with no resistance being felt by the rack, the space B between the end 108 of rod 63 and the upper end 113 of the rack is maintained by spring 115.

When the brake shoe-drum engaging force falls to a level where the spring biasing force on the wormshaft 74 can move the shaft toward and into engagement with the coupling hub 84, the brake shoes are close to the pint of leaving the drum and starting to develop running clearance. When the reengagement of conical serrated surfaces 85, 86 occurs, a resistance to rack travel is developed by the brake shoe springs and worm gear forces, and the rack travel and gear wheel rotation is stopped. The rod 63 continues to move downward in the continuing brake release stroke and the space B diminishes with the rod end 108 moving relative to the rod tube 111 against the force of the spring 115; with the result that a "no adjust" period exists from the instant of rack travel stop, which is related to the point where the brake shoes are starting to develoop clearance to the instant that rod end 108 abuts the rack end 113, corresponding to the amount of lining-drum clearance to be provided by the adjuster. When the rod and rack ends 108, 113 abut, the rack 67 will now drive the gear wheel 73 and coupling hub 84 through the one-way clutch 89 and rotate the wormshaft 74 in a clearance adjusting direction until the rack bottoms at surface 116 at the full released position of piston rod 44. When the ends abut and the rack bottoms at the same instant, when the brake clearance has been reduced to the desired value, no adjustment is possible, and the piston rod and linkage are in the full off position.

Installation of the adjuster 41 is effected by first placing the assembly onto the brake cam shaft 97 and then rotating the hexagonal end 92 of the wormshaft 74 with a wrench to rotate the adjuster 41 about the cam shaft 97 and position the lever 43 between the arms 48, 49 of the clevis 45. The pivot pin 52 is then inserted in the openings 51, 51 in the clevis arms and the aligned opening 50 in the lever to attach the adjuster to the clevis locked on the piston rod 44; the cotter pin 54 retaining the pivot pin 52 in position. The swivel pin 58 is then roughly positioned on the actuating rod 63 so that the reduced end 59 enters its mating hole 57 in the arm 49 and the cotter pin 61 installed. This is accomplished by rotating the rod 63 with a screwdriver engaged in the slot 65 to raise or lower the swivel pin or by rotating the swivel pin on the rod; the threaded engagement therebetween bringing the pin to a position of alignment with the pin hole. The final step is to rotate the rod 63 clockwise relative to the swivel pin (as seen in FIG. 6) until the lower end 108 bottoms on the end 113 of the rack 67 which is in its lowermost position (FIG. 7) and then lock the rod in position with the jam nut 66.

The condition obtained by this installation has the rack 67 bottomed on the reference surface 116 and the ends 108 and 113 in abutting engagement, with the space B located between the spherical ball portion 106 and the spherical closure 114 of the rod 63 and rod tube 111, respectively. The force of the spring 115 urging the rod and rack to separate is overcome by the physical position of the linkage in the initial full off position.

FIG. 9 discloses an alternate embodiment of a lost-motion device between the rack and actuating rod of the slack adjuster assembly with like parts having the same reference numeral with a script a. The lost-motion device 71a between the actuating rod 63a and the rack 67a includes a guide tube 109a, a rod tube 111a crimped into the groove 112a in the upper end 113a of the rack, and a sleeve 117 threadedly engaging the reduced lower threaded end 118 of the rod 63a. The sleeve 117 terminates at its lower end in the spherical ball portion 106a integral therewith and at its upper end in an enlarged polygonal head 119 adapted for engagement by a suitable tool. A compression spring 115a encompasses the threaded end 118 and abuts the lower surface 107a of the spherical ball portion 106a and the upper end 113a of the rack 67a. A jam nut 121 is threaded on the rod end 118 above the sleeve to lock the sleeve 117 in an adjusted position.

This embodiment operates in the same manner as the embodiment of FIGS. 7 and 8 as far as automatic adjustment of the running clearance between the brake linings and drum upon wear of the linings. The advantage of this embodiment is that the B dimension, corresponding to the brake running clearance, established at the time of manufacture can be changed during service life to provide a reduction or increase in the brake clearance to accommodate unusual braking practice or to recover degraded adjusting performance of the slack adjuster and extend its service life. Adjustment of the B spacing is made by retracting the jam nut 121 with a wrench or other suitable tool, rotating the sleeve 117 relative to the rod end 118 by engagement of the tool on the polygonal head 119 to change the spacing, and locking the sleeve through the jam nut 121.

FIG. 10 discloses a third embodiment of lost-motion device with similar parts having the same reference numeral with a script b. This lost-motion device 71b between the actuating rod 63b and the rack 67b utilizes a clevis and pin attachment, but the rod is not rotatable relative to the swivel pin when in its operative position. The rod 63b has a lower smooth portion 122 having an annular groove 123 for the upper end of a flexible boot (not shown) and a second spaced groove for a lock ring 124. The rod terminates in a reduced flattened end 125 having parallel flat surfaces with an elongated opening 126 formed therein.

A guide tube 127 in the counterbore of the opening 68b has an upper flared edge 128, and the rack 67b terminates in an enlarged flared end 129; with the outer flared surface of end 129 being complementary to the flared edge 128 and providing an additional stop for downward movement of the rack. The end 129 of the rack has a diametrically extending slot 131 therethrough and a transverse opening 132 to receive a limit pin 133, which pin also extends through the opening 126 in the rod end 125. The length of movement of the pin 133 in the opening 126 provides the lost-motion spacing corresponding to the brake running clearance. A compression spring 134 closely encompasses the rod 63b with the upper end abutting the lock ring 124 and the opposite end abutting the flared end 129 of the rack.

In use, upward movement of the rod 63b for a distance corresponding to the running clearance of the brake linings is allowed by the elongated opening 126. Once the stationary pin 133 reaches the lower end of the opening 126, further upward movement of the rod will lift the rack 67b. Likewise, the rod will move downward relative to the rack as allowed by the opening 126 when the worm and worm gear are locked together to prevent rotation of the wormshaft.

FIG. 11 discloses a fourth embodiment of a lost-motion device 71c with like parts having the same reference numerals with a script c. In this embodiment the actuating rod 63c terminates in a spherical ball end 136 on a reduced portion 135 of the rod, and the rack 67c has an upward projection or pin 137 with a washer 138 secured thereto and spaced from the end of the rack. The opening 68c for the rack has a counterbore 139 with an enlarged step 141 at the upper end of the boss 69c. A sleeve 142 is slidably received in the counterbore 139 and has an inturned flange 143 at the lower end adapted to abut the shoulder 144 formed by the counterbore. A spring washer 145 is positioned on an intermediate shoulder 146 in the sleeve and has a central concave depression 147 against which the ball end 136 abuts.

A gland 148 mounted in the upper end of the sleeve combines with the spring washer 145 to form a positive, pivotable attachment with the ball end 136 when the upper edge 149 of the sleeve is edge rolled or staked over against the gland. A compression spring 151 is located in the sleeve between the spring washer 145 and the washer 138 and a sliding seal ring 152 is positioned in the enlarged step 141 to seal the sleeve within the boss 69c. Optionally, a flexible boot could be utilized in place of the sliding seal 152 and the gland 148 could be threadingly engaged within the sleeve. In this embodiment, the spacing between the washer 138 and the inturned flange 143 on the sleeve 142 corresponds to the running clearance of the brake linings and drum. Operation of this embodiment is substantially the same as the embodiment of FIGS. 7 and 8 except that the relative motion prior to actuation of the rack if between the sleeve 142 and the rack 67c.

FIG. 12 discloses an alternate embodiment of the linkage between the piston rod and the actuating rod suited for field installation with like parts have the same reference numeral with a script d. The piston rod 44d threadedly engages the base 46d of the clevis 45d, and the spaced arms 48d, 49d receive the upper end of the lever 43d therebetween. A separate attachable arm 153 parallels the arm 49d and terminates in an inturned end 154 having an open-ended slot 155 encompassing the piston rod 44d; the end 154 being clamped between the clevis base 46d and the jam nut 47d. The arm has an opening 156 aligned with the openings 50d and 51d in the lever 43d and clevis arms 48d, 49d, respectively, to receive a special long pivot pin 52d having an enlarged head 53d at one end and retained by a cotter pin 54d adjacent the opposite end.

The free end 157 of the arm has an offset 158 and is provided with an opening 159 to receive the reduced end 59d of the swivel pin 58d threadingly engaging the actuating rod 63d. As shown, the swivel pin 58d can be mounted in a bushing 160 in the opening 159, if desired.

We claim:

1. In a slack adjusting mechanism usable in lever actuating systems including an actuatable rotatable lever connected to and rockable about the axis of rotation of a cam shaft for actuation of the system, linkage means operatively connected to a load-biased wormshaft and coupling to provide a fixed reference point internal to the adjuster cooperating with a variably located external pivot point, including a rack, an actuating rod and lost-motion means, such that when the external pivot point is at a fully released position, said rod abuts said rack and said rack abuts said internal reference point, and adjustment is terminated.

2. A slack adjusting mechanism as set forth in claim 1, wherein said linkage means cooperating with said wormshaft and coupling prevents adjustment when said rack is abutting said internal reference point and said rack and rod are spaced apart and said external pivot point is a distance away from being fully released proportional to a desired brake clearance travel, sid distance being proportional also to the spacing between said rack and rod.

3. A slack adjusting mechanism as set forth in claim 1, wherein said lost-motion means cooperates with said wormshaft and coupling to obtain abutment of said rack and rod and resultant adjusting rotation of said wormshaft and coupling after (a) said biased wormshaft senses imminent disengagement of brake shoes and drum, (b) engages with said coupling and (c) prevents rotation thereof for a desired portion of reciprocating motion, sid rotation being prevented by separation of said rack and rod by a biasing spring and said rack is spaced rom said internal reference point, said adjusting rotation ceasing when said rack and rod are in abutting engagement and said rack abuts said internal reference point.

4. A slack adjusting mechanism as set forth in claim 1, in which said lost-motion means connects said rack and rod, said rod being rotatable and swivelable in said connection with biasing means urging said rack and rod apart, and said connection holding said rack and rod in general axial alignment.

5. A slack adjusting mechanism as set forth in claim 4, in which said lost-motion means includes means to adjust the lost-motion spacing between said rack and rod.

6. A slack adjusting mechanism as set forth in claim 1, in which said lost-motion means includes a reduced diameter lower rod portion of said actuating rod, a rod tube secured to the upper end of said rack, a spherical ball enlargement on the reduced diameter rod portion spaced from the end thereof and located within said rod tube, and spring biasing means located between said spherical ball enlargement and the upper end of the rack, said rod tube terminating at its upper edge in a sperical closure complementary to said spherical ball enlargement.

7. A slack adjusting mechanism as set forth in claim 6, in which said lower rod portion is externally threaded, an internally threaded sleeve received on said lower rod portion, said spherical ball enlargement being integral with and forming the lower end of said sleeve, and a jam nut on said rod portion above and adapted to engage said sleeve.

8. A slack adjusting mechanism as set forth in claim 1, in which said lost-motion means includes a flattened lower end on said actuating rod having an elongated opening therein, said rack having an upper end with a diametrically extending slot therein adapted to receive said flattened rod end, and a transverse pin mounted in said upper rack end to extend through said slot therein and through said elongated opening.

9. A slack adjusting mechanism as set forth in claim 8, including a guide tube mounted in said mechanism to receive said rack therein and having a flared upper edge, said rack having an enlarged upper end with a flared surface complementary to the flared edge of said guide tube.

10. A slack adjusting mechanism as set forth in claim 1, in which said lost-motion means includes a reduced diameter lower rod portion terminating in a spherical ball, an upwardly extending projection on the upper end of said rack, a stop washer suitably secured to said projection and spaced from said upper rack end, a sleeve slidably mounted in said adjuster and terminating in an inwardly extending flange positioned between said washer and the upper end of said rack, socket means secured in the upper end of said sleeve to receive said spherical ball, and spring biasing means acting between said socket means and said washer.

11. A slack adjusting mechanism as set forth in claim 10, in which said socket means includes spring washer having a concave surface and supported by a shoulder in said sleeve, and a gland received in said sleeve in spaced relation to said spring washer and suitably retained therein, said gland combining with said washer to form a positive, pivotable attachment with said spherical ball.

12. An automatic slack adjuster for a vehicle brake system of the type comprising a rotatably mounted braking lever and a cam shaft operatively connected thereto for rotation about the axis of rotation of said lever to oscillate a cam member, said slack adjuster comprising a worm gear journalled in said lever and non-rotatably mounted on said shaft to from an angularly adjustable connection between said braking lever and said can shaft, a load-biased wormshaft and coupling in said lever and carrying a worm operatively engaging said worm gear for angular adjustment thereof, a gear wheel journalled on said wormshaft, a one-way clutch operatively connecting said gear wheel with said wormshaft, a reciprocable rack operativly engaging said gear wheel, a fixed reference point in said lever adapted to be engaged by said rack, an actuating rod and lost-motion means operatively connecting said rack and actuating rod, said actuating rod causing reciprocation of said rack in response to angular movement of said braking lever in the braking and brake releasing directions beyond a predetermined angular departure from its brake release position.

13. An automatic slack adjuster as set forth in claim 12, in which a force transmitting member is pivotally secured to said braking lever by a clevis, said clevis having an extension with a swivel connection to said actuating rod.

14. An automatic slack adjuster as set forth in claim 13, in which said extension is an extended offset portion of one arm of said clevis.

15. An automatic slack adjuster as set forth in claim 13, in which said extension includes an actuating arm paralleling said clevis with an inturned end secured to said force transmitting member and an opposite offset end, and a swivel pin pivotally mounted in said offset end and operatively connected to said actuating rod.

16. An automatic slack adjuster as set forth in claim 12, wherein a predetermined slack clearance is formed in said lost-motion means corresponding to the running clearance between the brake shoes and the brake drum of the vehicle.

17. An automatic slack adjuster as set forth in claim 12, in which said coupling includes a serrated conical surface on said wormshaft and a coupling hub journalled on said wormshaft and having a serrated conical surface complementary to and engageable with the conical surface on said wormshaft, said one-way clutch acting to engage said gear wheel and coupling hub in one direction of rotation of said gear wheel.

18. An automatic slack adjuster as set forth in claim 12. in which said fixed reference pint is an end surface of an opening receiving said rack, with a mating surface on said rack abutting said fixed reference point when said brake is in the fully released position.

19. An automatic slack adjuster as set forth in claim 12, in which said rack has an enlarged upper end and said actuating rod has a reduced diameter lower portion terminating in an end adapted to abut the upper end of said rack, and said lost-motion means includes a spherical ball enlargement on said reduced lower rod portion spaced from the end thereof, a rod tube secured at its lower edge onto the upper end of said rack and terminating at its upper end in a spherical closure encompassing said reduced rod portion, and biasing means in said rod tube between the upper end of the rack and the spherical ball enlargement.

20. An automatic slack adjuster as set forth in claim 19, in which said spherical closure is complementary to said spherical ball enlargement, and the distance between said spherical closure and said spherical ball enlargement when said lower rod end abuts said upper rack end provides the lost-motion corresponding to the running clearance between the brake shoes and drum.

21. An automatic slack adjuster as set forth in claim 20, including a guide tube secured in said lever as an extension of an opening receiving said rack and conformably receiving said rod tube and said upper end of the rack.

22. An automatic slack adjuster as set forth in claim 21, wherein said lower rod portion has an annular groove spaced above said spherical ball portion, and an elastic boot encompassing said lost-motion means and having one end secured in said annular groove and the opposite end frictionally engaging said guide tube.

23. An automatic slack adjuster as set forth in claim 19, including an internally threaded sleeve encompassing said lower rod portion, said sleeve having the spherical ball enlargement integral therewith at the lower end thereof, said lower rod portion being externally threaded so as to threadingly engage said sleeve for adjustment of said spherical ball enlargement relative to said spherical closure.

24. An automatic slack adjuster as set forth in claim 23, in which said sleeve has an enlarged polygonal upper end, and a jam nut on said lower rod portion adapted to engage and lock said sleeve in its adjusted position.

25. An automatic slack adjuster as set forth in claim 12, in which said rack has an enlarged upper end defined by a flared surface, a guide tube in said lever having a flared upper edge complementary to said flared surface on the rack, a diametrically extending slot through said rack upper end, a transverse pin in said rack extending through said slot, and said actuating rod terminating in a flattened lower end slidably received in said slot, said flattened end having an elongated opening therein receiving said pin.

26. An automatic slack adjuster as set forth in claim 25, including a compression spring encompassing said actuating rod, a stop ring positioned in an annular groove in said rod and spaced from said flattened end, said spring having one end abutting the upper end of said rack and the opposite end abutting said stop ring.

27. An automatic slack adjuster as set forth in claim 12, in which said lost-motion means includes a reduced lower portion on said actuating rod terminating in a spherical ball, a projection on the upper end of said rack, a stop washer secured to said projection and spaced from the end of the rack, a sleeve slidably mounted in the lever and terminating at its lower end in an inturned flange encompassing said projection and positioned between the stop washer and the upper rack end, socket means secured in the upper end of the sleeve and providing a pivotal attachment for said spherical ball, and biasing means between said socket means and said washer.

28. An automatic slack adjuster as set forth in claim 27, in which said socket means includes a spring washer having a concave face engaging said spherical ball, and a gland located in said sleeve encompassing said lower rod portion, said gland having a lower complementary spherical surface receiving said spherical ball.

29. An automatic slack adjuster as set forth in claim 28, in which said sleeve has an intermediate shoulder supporting said spring washer, the upper end of said sleeve being staked over the upper surface of the gland to retain the gland therein, and sealing means in said lever engaging said sleeve.

30. An automatic slack adjuster as set forth in claim 13, wherein said swivel connection forms a variably located external pivot point, such that when said external point is at its fully released position, said rod is abutting said rack and the rack is abutting said internal reference point and no adjustment is possible.

31. An automatic slack adjuster as set forth in claim 13, wherein said lost-motion means cooperates with said wormshaft and coupling to prevent adjustment when said rack is abutting said internal pint and the rack and adjusting rod are spaced apart with external point spaced from the fully released position proportional to the running clearance of the brake, said distance also being proportional to the spacing between said rack and rod.

32. An automactic slack adjuster as set forth in claim 13, wherein said lost-motion means cooperates with said wormshaft and coupling to obtain abutment of said rack and rod and consequent adjusting rotation of said wormshaft and coupling after said biased wormshaft (a) senses imminent disengagement of the brake shoes and drum, (b) engages with said coupling, and (c) prevents rotation thereof for a predetermined portion of reciprocating motion, said lost-motion means including a compression spring biasing said rack and rod apart, said rotation being prevented when said rack and rod are separated by said spring and said rack is spaced from said internal point, said adjusting rotation stopping when said rack and rod are in abutting engagement and said rack engages said internal reference point.

33. An automatic slack adjuster as set forth in claim 12, in which said lost-motion means retains said rack and rod in generally axial alignment.

34. An automatic slack adjuster as set forth in claim 12, in which said lost-motion means provides an adjustable lost-motion distance.

35. An automatic slack adjuster as set forth in claim 12, including a piston actuated by the vehicle operator to apply the brakes, a clevis on the end of the piston pivotally connected to the braking lever and having an offset extension, a swivel pin pivotally mounted in said extension and operatively connected to the upper end of said actuating rod, said coupling comprising a serrated conical surface on said wormshaft and a coupling hub journalled on said wormshaft and having a complementary serrated conical surface, said one-way clutch acting to engage said gear wheel and said coupling hub in one direction of rotation of the gear wheel, said lever having an opening receiving said rack and provided with a lower end surface forming said internal reference point, and said lost-motion means includes a reduced lower portion on said rod, means connecting the reduced rod portion with said rack for limited relative motion, and biasing means urging said rack and rod apart as permitted by said limited motion means.

36. An automatic slack adjuster as set forth in claim 35, in which said limited motion means includes a spherical ball enlargement integral with said reduced rod portion, and a rod tube connected to said rack encompassing said lower rod portion, spherical ball enlargment and biasing means and terminating at its upper end in a spherical closure above said spherical ball enlargement.

37. An automatic slack adjuster as set forth in claim 35, in which said reduced rod portion is externally threaded and said limited motion means includes a sleeve threadingly engaging said threaded rod portion, said sleeve terminating at its lower end in a spherical ball enlargement and at its upper end in an enlarged polygonal portion, a jam nut on said threaded rod portion above said sleeve, and a rod tube connected to said rack and encompassing said lower rod portion, sleeve and biasing means and terminating at its upper edge in a spherical closure adapted to cooperate with said spherical ball enlargement.

38. An automatic slack adjuster as set forth in claim 35, in which said lower rod portion has parallel flattened surfaces, and said limited motion means includes an enlarged upper end on said rack with a flared external surface and having a slot extending diametrically there-through to receive the flattened rod end, a transverse pin positioned in said rack upper end and extending through said slot, said flattened end having an elongated opening therein receiving said transverse pin, and a stop ring positoned on said rod spaced above said flattened portion, said biasing means comprising a compression spring encompassing said rod and abutting at its opposte ends the enlarged rack end and said stop ring.

39. An automatic slack adjuster as set forth in claim 35, in which said limited motion means includes a spherical ball enlargement on the lower end of said reduced rod portion, a projection extending upward from the upper end of the rack, a stop washer on said projection spaced from said rack end, a sleeve in sliding sealing engagement with said lever and terminating at its lower end in an inturned flange positioned between said stop washer and the upper rack end, a shoulder intermediate the ends of said sleeve, a spring washer supported on said shoulder and having a concave surface conformably engaging said spherical ball enlargement, and a gland encompassing said lower rod portion and retained in the upper end of said sleeve, said gland having a generally spherical surface conformably engaging said spherical ball enlargement above said spring washer, said biasing means comprising a compression spring in said sleeve and abutting the stop washer and the spring washer.

* * * * *

UNITED STATES PATENT OFFICE
CERTIFICATE OF CORRECTION

PATENT NO. : 4,019,612
DATED : April 26, 1977
INVENTOR(S) : George P. Mathews and Thaddeus Lech Jr.

It is certified that error appears in the above-identified patent and that said Letters Patent are hereby corrected as shown below:

Column 10, line 24, change "sid" to -- said --.

Column 10, line 35, change "sid" to -- said --.

Column 10, line 37, change "rom" to -- from --.

Column 11, line 28, insert -- a -- before "spring washer".

Column 11, line 43, change "can" to -- cam --.

Column 12, line 17, change "pint" to -- point --.

Column 13, line 46, change "pint" to -- point --.

Signed and Sealed this sixteenth Day of August 1977

[SEAL]

Attest:

RUTH C. MASON
Attesting Officer

C. MARSHALL DANN
Commissioner of Patents and Trademarks